United States Patent [19]
Faroudja

[11] 4,030,121
[45] June 14, 1977

[54] VIDEO CRISPENER

[76] Inventor: Yves C. Faroudja, 26595 Anacapa Drive, Los Altos Hills, Calif. 94022

[22] Filed: Dec. 2, 1975

[21] Appl. No.: 636,837

[52] U.S. Cl. .................................. 358/37; 307/263; 358/166

[51] Int. Cl.² .................... H04N 5/14; H04N 9/535

[58] Field of Search .................... 358/37, 166, 162; 178/DIG. 25, DIG. 34; 307/263

[56] References Cited

UNITED STATES PATENTS

| 2,678,964 | 5/1954 | Loughlin | 358/166 |
| 2,740,071 | 3/1956 | Goldmark et al. | 328/127 X |
| 2,851,522 | 9/1958 | Hollywood | 358/166 |
| 2,863,999 | 12/1958 | French | 358/166 X |
| 3,946,152 | 3/1976 | Illetschko et al. | 358/162 |

OTHER PUBLICATIONS

A. N. Thiele, "Horizontal Aperture Equalization", Radio and Electronics Engineer, Oct. 1970, p. 193.
"Mark IV Automatic Image Enhancer, Models 8010, 8310, and 8410," CBS Laboratories Technical Bulletin, Mar. 1974.
Goldmark and Hollywood, "A New Technique for Improving the Sharpness of Television Pictures", Proceedings of the IRE, Oct. 1951, p. 1314–1322.

Primary Examiner—Robert L. Griffin
Assistant Examiner—Mitchell Saffian
Attorney, Agent, or Firm—David B. Harrison

[57] ABSTRACT

A system of shortening transition time of transitions occurring in video signals is disclosed which includes circuitry for multiplying a function of the full wave rectified first differential of the input video signal by a function of the second differential of the input video signal and then adding the waveform resulting from such a product to the properly delayed input signal to provide a crispened output video signal. The system may be provided to crispen the luminance and chroma signals of a color television video signal. A system for shortening transitions of low bandwidth chroma information with higher bandwidth luminance information is also disclosed.

28 Claims, 12 Drawing Figures

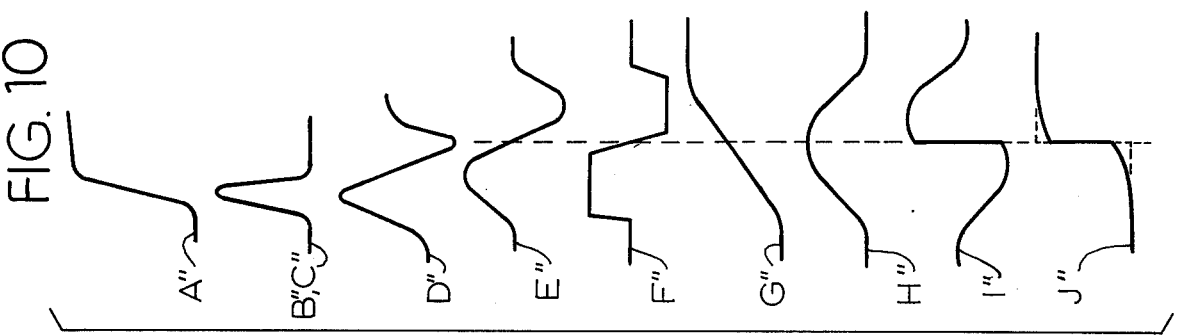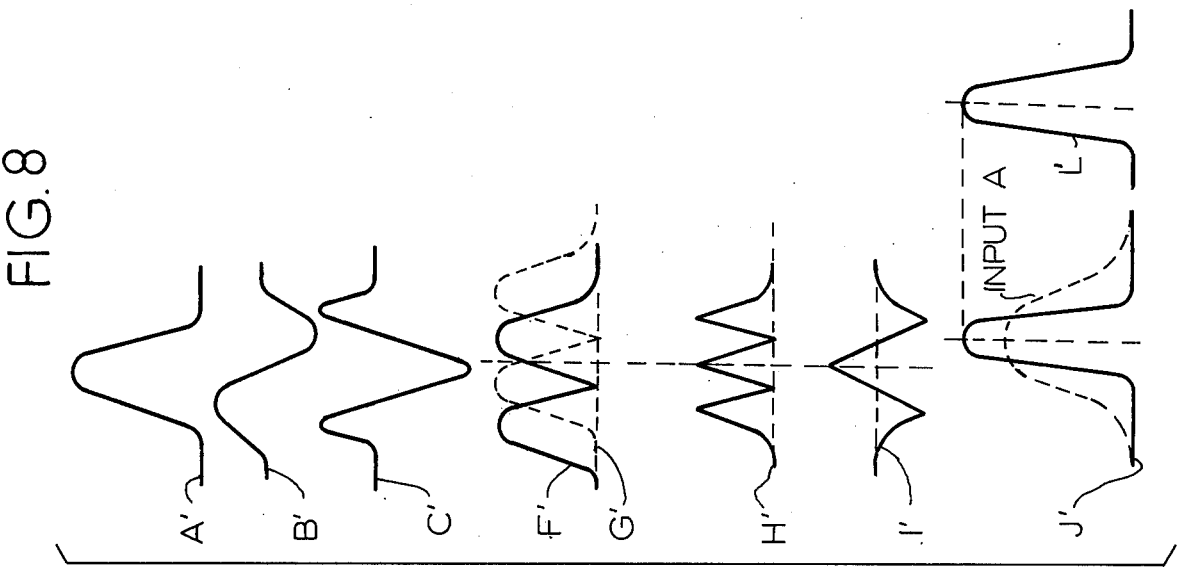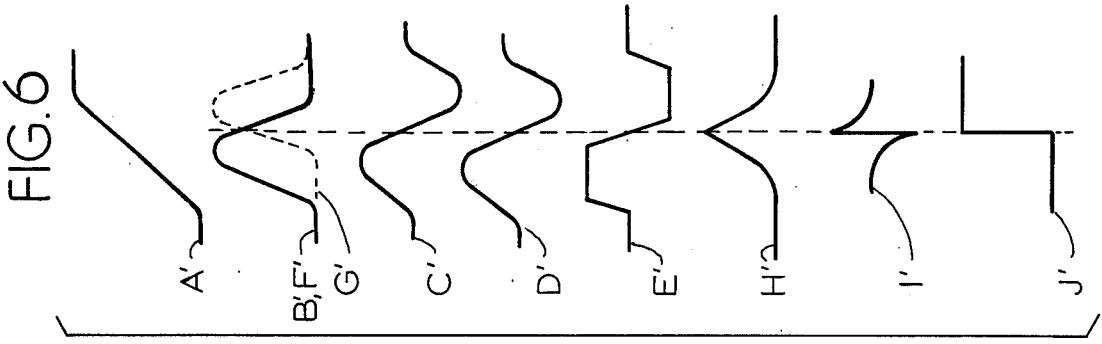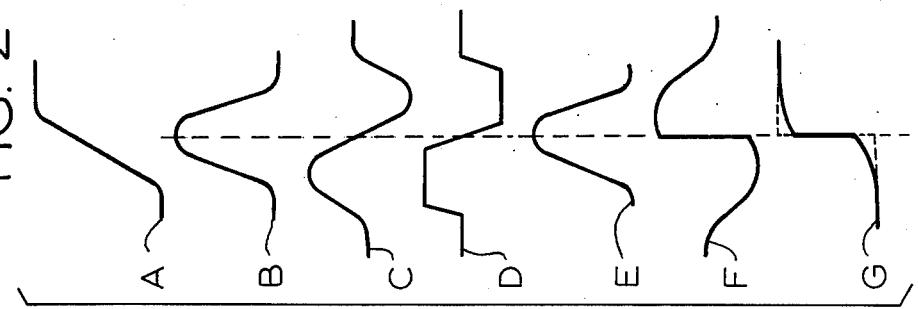

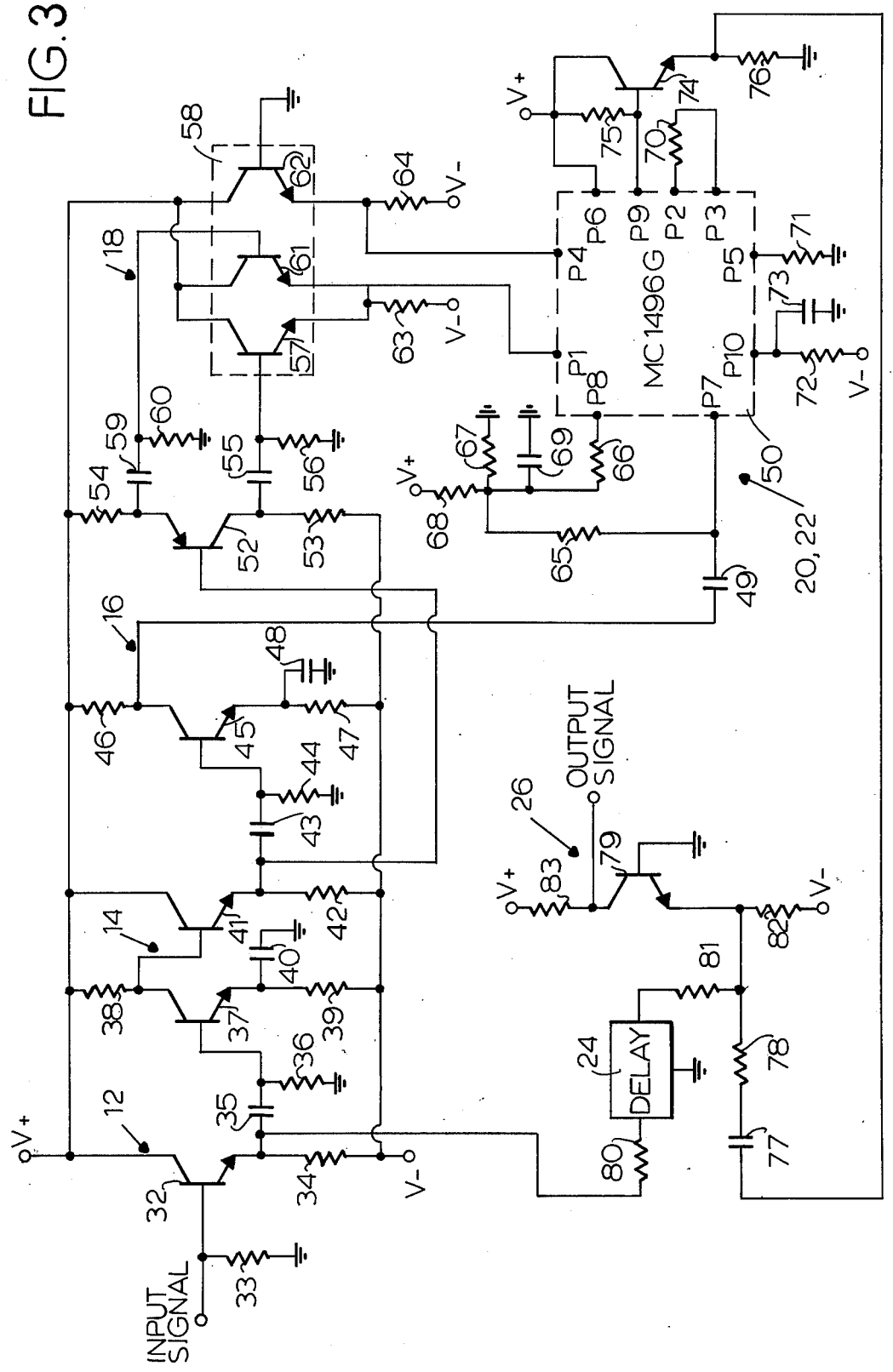

VIDEO CRISPENER

BACKGROUND OF THE INVENTION

This invention relates to television and is directed to method and apparatus for improving the sharpness of reproduced television pictures. This invention is applicable to monochrome and color television, and in the latter case, provides enhancement of the sharpness of both luminance and chroma channels.

The reproduction of geometrical details is an important problem in television. Many factors are involved, but when the number of lines per frame and of frames per second has been fixed, the horizontal resolution is largely a function of system bandwidth. With the presently used National Television System Committee or NTSC color television system, it is generally admitted that a 4.2MHz luminance bandwidth, leading to a 120ns transition duration is acceptable to provide a horizontal resolution which matches in the correct proportion the vertical resolution which is imposed by the 525 lines per frame standard. In the color difference signal channels, a 1.3MHz bandwidth for the I channel and a 500 KHz bandwidth for the Q channels are considered as acceptable.

It is a recognized fact that many links in the chain of television processing are often incapable of reaching the foregoing bandwidth requirements: video cameras, transmitting channels of reduced bandwidth, video tape recorders, etc.— often are not capable of full resolution. More particularly, the recent popularity of helical scan video recorders, due to their high portability and low cost, has resulted in the appearance of low luminance (2MHz) and chroma (350KHz) bandwidth pictures which are even present, sometimes, in sophisticated broadcasting environments. These low bandwidth pictures, generated because of the convenience of the equipment, are immediately recognizable by their "blurriness" and lack of resolution. The video bandwidth then has to be increased, if an increase of sharpness is to be witnessed. However, this is not always practical in television systems. For example, in a color camera, any bandwidth increase leads to tougher requirements for registration, quality of the pick-up tube, better optics etc.—and to a significant cost increase. For transmission systems, the transmission cost is directly proportional to the bandwidth. In the case of video tape recorders, higher bandwidth requires higher head-to-tape writing speed and generally more delicate and costlier mechanical structures.

For all these reasons, many attempts have been made in the past to increase the apparent sharpness of a television picture without increasing bandwidth capabilities throughout the system.

A first type of device known to the art for performing to some extent these functions were image enhancers and aperature equalization systems. These systems are described in the following publications: "Horizontal Aperature Equalization" by A. N. Thiele, *Radio and Electronic Engineer*, Vol. 40, No. 4, October 1970, page 193; *CBS Laboratories Mark IV Automatic Image Enhancer Technical Bulletin*, March 1974; *Philips Colour Telecine System* brochure, page 25 to 27.

Those devices and systems generally operated in a strictly linear fashion. A high frequency signal was derived from the input transition and was added to it without envelope delay error and with the proper phasing. In those conditions, the output transition was apparently shorter in duration than the input transition. However those devices had two apparent drawbacks:

First, noise, as well as signal, was enhanced in the process. In order to avoid this effect, some of those devices had a threshold in the enhancement path, threshold which, naturally would defeat enhancement for low-contrast television details.

Second, sharpening could not be obtained without preshoot and overshoot. While actual duration of a transition did not vary; the passage from black to white did not happen in the same fashion. The visible transition zone on the screen was as wide as before, but objects seemed to be surrounded with black and white margins. Thus, the preshoot and overshoot gave to the picture an unnatural or "cartoon" look.

A second type of device was found in video "crispeners." A "crispener" is essentially different in its nature, and has more ambitious goals, than an enhancer. A crispener is a transition-processing device whose purpose is the generation by non-linear processing of frequencies higher than the upper limit of the bandwidth of the input signal. Its objective is to shorten a transition without introducing preshoot and overshoot. Examples of prior art crispeners are described in U.S. Pat. No. 2,740,071 to Goldmark and Reeves, U.S. Pat. No. 2,851,522 to Hollywood, and in the article entitled "A New Technique for Improving the Sharpness of Television Pictures," Goldmark and Hollywood, *Proceedings of the IRE*, October 1951, page 1314.

Those two patents and the article described various approaches to increase sharpness which were based upon the following steps:

First, the video signal was submitted to a first differentiation,

Next, the differential waveform duration was reduced by means of a threshold in U.S. Pat. No. 2,740,071 and in U.S. Pat. No. 2,851,522 by means of a rectifier followed by a reactance applied to generate spikes of shorter duration than the input signal transition.

Those circuits were used in conjunction with the CBS field sequential color television system in 1951 and were abandoned when the CBS system was dropped as a color standard in 1955. Those circuits did not reach the market place later on (nor did circuits of similar nature) because of their weaknesses:

1. Those circuits were costly and complicated.
2. Those approaches were transition sign dependent and required two paths of rectification.
3. The correction waveform was essentially asymmetrical and an overshoot was unavoidable.
4. Short-line details, such as sine-square pulses, were reduced in contrast, as compared with true high bandwidth, linearily processed signals (see e.g. *Proceedings of the IRE*, October 1951, page 1318, Fig. 14).
5. Tracking, that is generation of a correction waveform strictly proportional to the transition level over variations as much as 40$db$, was impossible. As a result of those circuits large transitions exhibited overshoots, while small transitions were undercrispened.

Thus, the picture improvement brought about by those techniques, although noticeable, was not high enough to justify, in most applications, the high costs of circuit implementation and the inherent risks of instability necessarily resulting from complexity.

SUMMARY OF THE INVENTION

One object of the present invention is to provide a system for performing video crispening in order to obtain a resulting picture sharpness which is subjectively impossible to distinguish from the picture sharpness of a strictly linearly processed video signal having a significantly higher bandwidth, and without any apparent ill effects.

Another object of the present invention is to provide a video crispener system which does not exhibit visual preshoot or overshoot so that the crispened picture will look naturally sharp and without objectionable distortions or "cartoon" effects.

A further object of the present invention is to provide a crispener system which tracks linearly for transitions which vary over a range from noise level to 100% amplitude.

Yet another object of the present invention is to provide a system which has built-in noise protection and which does not degrade the signal to noise ratio.

A still further object of the present invention is to provide a video crispener characterized by simplicity and low cost of construction with resultant stability and high reliability.

The crispener of the present invention accomplishes the foregoing objects by providing the required reduction in transition times by multiplying a function of the full wave rectified first differential of the input transition signal by a function of the second differential of the input signal or of another signal which closely relates to the input signal, and then adding the waveform resulting from such a product to the properly delayed input signal to provide a crispened output signal. Various embodiments described herein differ only by the nature and the functions of the first and second differentials effected prior to multiplication. In one described embodiment particularly well adapted to television, a function of the first differential of a first input signal which may be a color chroma signal is multiplied by a function of the second differential of a second signal which may be a video luminance signal in a way that achieves crispening of the first signal by the transitions of the second signal which typically has a faster rise time characteristic of a higher bandwidth channel.

Each of the embodiments described hereinafter includes a first differentiator circuit followed by a full wave rectifier to make the first differential of the signal to be crispened independent of sign, i.e., direction of transition. A second differentiator circuit is included to provide a second differential signal of an input waveform. A limiter is included to clip the peaks of the second differential signal and thereby provide a clipped waveform. The clipped second differential and the function of the full wave rectified first differential are then multiplied in a doubly balanced amplitude modulator circuit functioning as a four quadrant multiplier. The resultant product is then added in correct time and sign relation to the input signal in an adder circuit to provide a crispened output signal which has a shorter transition duration than the input signal, so that the crisp output signal approximates closely the signal which would be expected from a television system having a substantially higher bandwidth than is actually available.

Combinations of crispeners may be included in a color picture crispening system to improve overall color picture quality through the crispening of both the chroma and luminance signals.

BRIEF DESCRIPTION OF THE DRAWINGS

FIG. 2 is a waveform diagram of signals at various points in the apparatus of FIG. 1.

FIG. 3 is a schematic diagram of the circuitry of the apparatus of FIG. 1.

FIG. 6 is a waveform diagram of signals at various points in the apparatus of FIG. 4.

FIG. 8 is a waveform diagram of impulse signals at various points in the apparatus of FIG. 4.

FIG. 10 is a waveform diagram of signals at various points in the apparatus of FIG. 9.

DETAILED DESCRIPTION OF THE PREFERRED EMBODIMENTS

Figure 1:
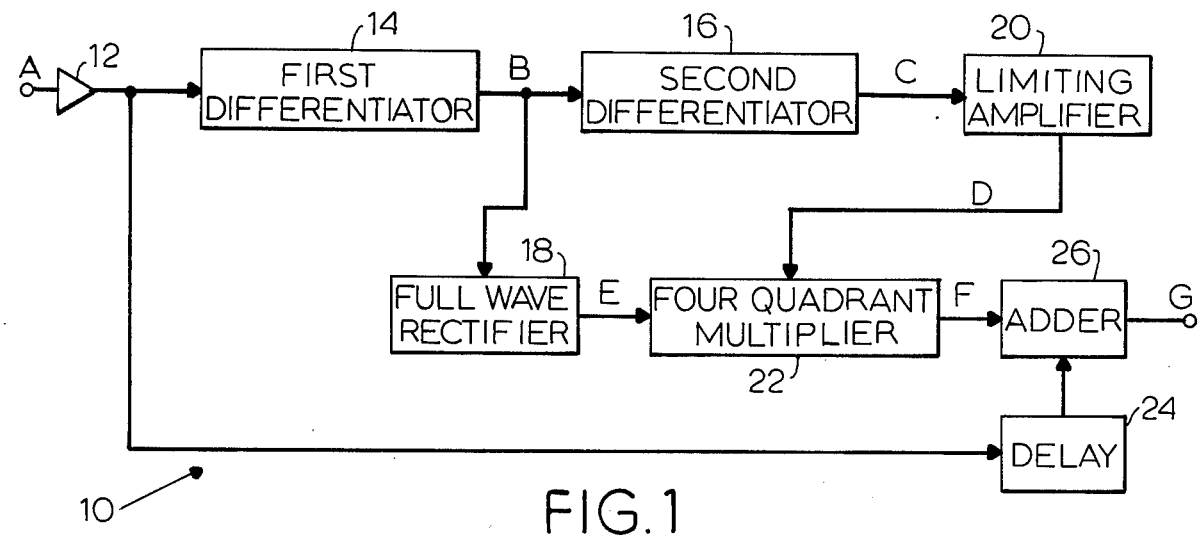
FIG. 1 is a block diagram of a first preferred embodiment of apparatus employing the principles of the present invention for crispening video images.

There are three presently preferred embodiments of apparatus incorporating the principles of the present invention. These three embodiments will now be described in order of increasing complexity and crispening efficiency.

FIRST EMBODIMENT, FIGS. 1-3

The first embodiment is the least complex and the least costly to implement while providing substantial improvements in the crispness of video images. The first embodiment 10, shown in FIG. 1, includes an input preamplifier 12, a first differentiator 14, a second differentiator 16, a full wave rectifier 18, a limiting amplifier 20, a four quadrant multiplier 22, a delay circuit 24, and an adding circuit 26.

The video signal to be crispened, waveform A of FIG. 2, is received at the input of the input amplifier 12 wherein the signal is amplified and sent to the first differentiator 14; it is also sent to the input of the delay circuit 24. The output of the first differentiator 14, waveform B of FIG. 2, is supplied to the input of the second differentiator 16; it is also supplied to the input of the full wave rectifier 18. The signal output of the second differentiator 16 is applied to the limiting amplifier 20 to produce the clipped waveform shown as waveform D. The clipped waveform amplifier 20 is then applied to one input of the four quadrant multiplier 22. The output of the full wave rectifier 18, waveform E, which is always positive going and therefore sign independent, is supplied to another input of the four quadrant multiplier 22. The product output of the multiplier 22, waveform F, whose polarity is selected to be opposed to the polarity of waveform D, is supplied to the adding circuit 26 as is an output from the delay circuit 24. The adding circuit 26 sums the product signal from the multiplier 22 and the delayed input signal from the delay circuit 24 to provide transition shortened video as the output of the crispener 10. Some slight rounding is characteristic of the output of the crispener 10; it is overcome in other more complex embodiments described hereinafter.

The circuitry of the apparatus of the first preferred embodiment is shown in the schematic diagram of FIG. 3. The input signal is applied in the input circuit 12 to the base of a transistor 32 configured as an emitter follower amplifier. A resistor 33 is connected to the base to provide impedance matching, bias point, and to regulate the amplitude of the signal appearing on the base of the transistor 32. The collector of the transistor 32 is connected to the plus voltage bus V+ and the emitter of transistor 32 is connected through an emitter resistor 34 to the minus voltage bus V−.

The signal at the emitter of the transistor 32 follows two paths: one path being through the delay line 24 and the other into the first differentiator 14 through a network consisting of a series capacitor 35 and a shunt resistor 36 which provide the base circuit of a transistor 37. The collector of transistor 37 is connected through a load resistor 38 to the V+ bus, and the emitter of transistor 37 is connected to the V− bus through an emitter resistor 39. An emitter capacitor 40 is connected to ground. The transistor 37 and the components connected thereto, capacitor 35, resistor 36, resistor 39, capacitor 40 provide in combination the first differentiation network 14. It is to be noted that the gain between the collector of transistor 37 and the emitter of transistor 32 is mathematically and directly proportional to the frequency without error, so that the network of the differentiator 14 provides a pure mathematical differentiation over a very wide frequency range. The products of the values of the capacitor 35 multiplied by the resistor 36 and the capacitor 40 multiplied by the resistor 39 are equal.

After differentiation by the first differentiator 14 the signal is applied to an emitter follower transistor 41 by direct connection from the collector of transistor 37 to the base of transistor 41. The collector of transistor 41 is returned directly to the V+ bus and the emitter of transistor 41 is connected through an emitter resistor 42 to the V− bus. The output from the emitter of transistor 41 passes through a network composed of a series capacitor 43 and a shunt resistor 44 in the base circuit of a transistor 45. The collector of transistor 45 is returned to the V+ bus through a load resistor 46, and the emitter of transistor 45 is returned to the V− bus through an emitter resistor 47. An emitter capacitor 48 is connected to ground. The circuitry including the transistor 45 and its associated components, capacitors 43 and 48, and resistors 44 and 47, provide the second differentiator 16. The operation of the second differentiator 16 is the same as that described in connection with the first differentiator 14 except that a second differential of the input waveform results therefrom. The output of the second differentiator 16 is taken from the collector of transistor 45 through a DC blocking capacitor 49 to a first input on pin P7 of an integrated circuit 50 which provides the limiting amplifier 20 and four quadrant multiplier circuit 22. The integrated circuit 50 will be described in more detail hereinafter.

The first differentiated waveform, waveform D of FIG. 2, which appears at the emitter of transistor 41 is applied directly to the base of a phase inverter transistor 52. Transistor 52 is used to provide two waveforms of equal amplitude and opposite phase on its emitter and collector respectively. These inverted signals drive the full wave rectifier 18 which consists of two transistor in a monolithic IC transistor array such as type CA 3018 made by RCA. The signal on the emitter of transistor 52 is passed through an RC network of a series capacitor 55 and a shunt resistor 56 to the base of a transistor 57 in an integrated circuit array 58. The signal on the collector of transistor 52 is likewise passed through an RC network of a series capacitor 59 and shunt resistor 60 to a base of a transistor 61 also within the integrated circuit 58. A third transistor 62 within the integrated circuit 58 is used solely for the purpose of compensating for temperature variations resulting in temporary changes of the base to emitter voltages of the transistor 57 and 61 in the integrated circuit 58. The collectors of transistors 57, 61 and 62 are tied together and connected directly to the V+ bus. Sign independent full wave rectified signal, waveform E, is taken from the common emitters of transistors 57 and 61 to input P1 of the integrated circuit 50. The emitters of transistors 57 and 61 are also returned to the V− bus through a resistor 64. A DC voltage appears at the emitter of transistor 62 and is applied to an input P4 of the integrated circuit 50 to balance any direct current shift appearing at input P1 of the integrated circuit 50.

Figure 4:
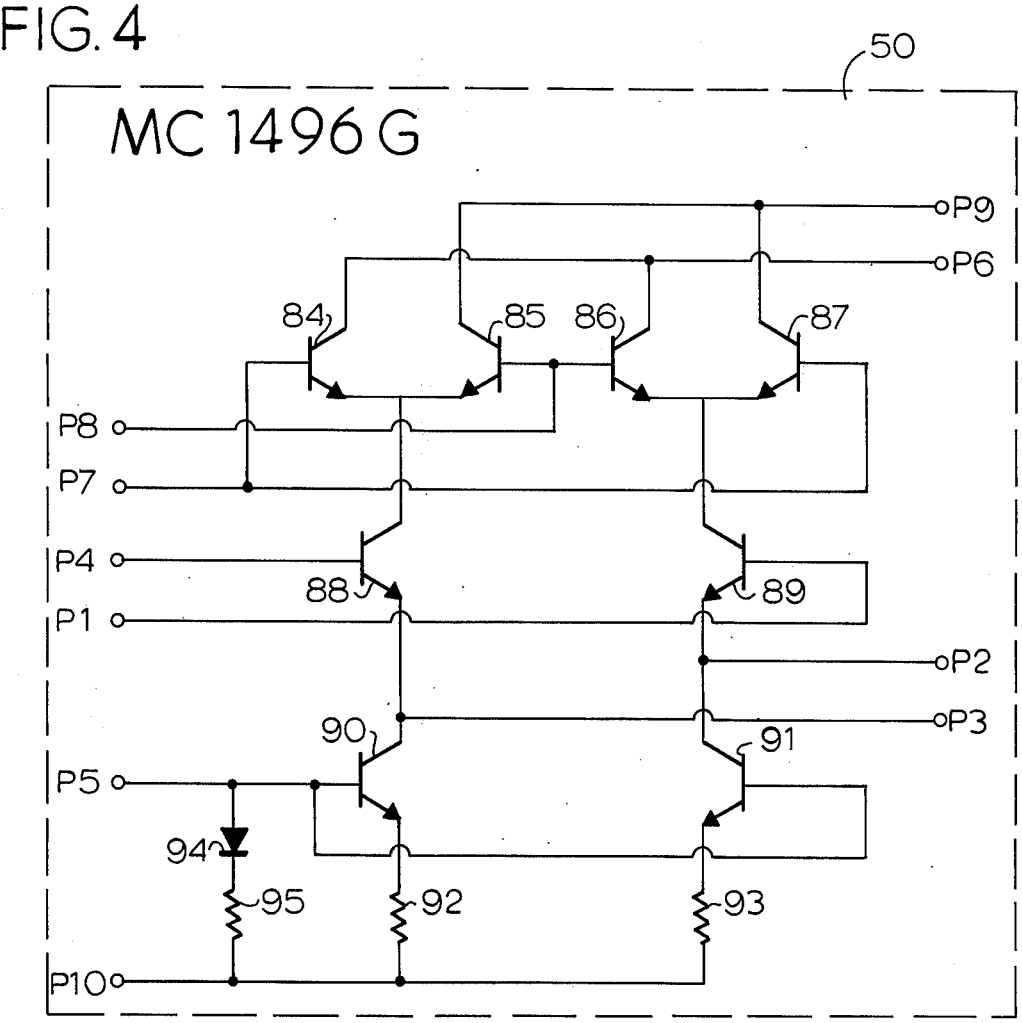
FIG. 4 is a schematic diagram of a circuit element common to the crispener circuits described herein.

The integrated circuit 50 is a commercially available AM doubly balanced modulator, type MC 1496 G which is manufactured by Motorola. The MC 1496 G integrated circuit has an internal circuit configuration as shown in FIG. 4. Basically, this monolithic circuit includes a dual differential amplifier in combination with a standard differential amplifier driven from constant current sources. Four transistors 84, 85, 86 and 87 provide the dual differential amplifier. This standard differential amplifier is provided by transistors 88 and 89, and transistors 90 and 91 and associated components 92, 93, 94 and 95 provide constant current sources for the standard differential amplifier. The pin connection shown by numeral P1 through P10 correspond to the pin numerals for the MC 1496 G which is incorporated herein as IC 50 in FIG. 3, IC 152 in FIG. 7, and IC 260 in FIG. 11.

The integrated circuit 50 is configured in the crispener 10 to operate as a four quadrant multiplier. Integrated circuit 50 receives the second differential signal from the collector of transistor 45 through the blocking capacitor 49 on pin P7 thereof. It multiplies the signal on pin P7 by the full wave rectified first differential signal which appears at the common emitters of transistors 57 and 61. This multiplication by the integrated circuit 50 is not accomplished according to a linear process; rather, it is done linearly only when the amplitude of the second differential appearing at the collector of transistor 45 is low. When the amplitude at the collector of transistor 45 has reached a level corresponding to, e.g. a three IRE unit transition level, the multiplication will be in effect provided by the second differential as limited by an internal functioning of the integrated circuit 50. As a result the signal appearing at input P7 of the integrated circuit 50 will be approximately proportional to the amplitude of the first differential, except for very low transitional levels where the signal will be lower than the first differential proportional value. The limiting action provided internally within the integrated circuit 50 provides noise protection as well as the feature of perfect tracking, i.e., the amplitude at the output is proportional to the amplitude of the first differential. Other componenets needed for the proper functioning of the integrated circuit 50 include an input impedance and biasing network consisting of resistors 65, 66, 67 and 68. A capacitor 69 bypasses the common node of resistors 66, 67 and 68 to ground. Gain of the integrated circuit 50 is governed by the value of a resistor 70 connected between pins P2 and P3 thereof. Direct current bias is governed by a resistor 71 from pin P5 of integrated circuit 50 to ground, and DC return is provided from pin P10 through a resistor 72 to the V− bus. A bypass capacitor 73 bypasses pin P10 to ground. The limiting function of IC 50 is governed by the amount of signal level on pin P7 with large levels being limited.

The output of the integrated circuit 50 is taken from pin P9 thereof to the base of a transistor 74. A resistor 75 is connected between the base and collector of transistor 74. The collector of transistor 74 is connected to the V+ bus directly so that transistor 74 is an emitter follower. The integrated circuit 50 is connected to the V+ bus via pin P6 thereof. The resistor 75 functions not only to bias transistor 74 for proper operation, it also functions as the load resistor at the output of the integrated circuit 50.

The output of the transistor 74, waveform F of FIG. 2, appears at the emitter thereof which has an emitter resistor 76 to ground. The output, being the product of th second differential and the rectified first differential which is sign independent is provided through a DC blocking capacitor 77 and series resistors 78 to the emitter circuit of the transistor 79 which provides the adding circuit 26.

The input signal taken from the emitter of transistor 32 is provided through an impedance matching resistor 80 into the delay line 24 and out therefrom through a series resistor 81 to the emitter of the adding transistor 79 whereupon the two signals are combined to provide a sum output waveform G as shown in FIG. 2. A biasing resistor 82 and a load resistor 83 are provided in the emitter and collector circuits respectively of the transistor 79.

It is to be understood in considering the operation of the apparatus shown as the first preferred embodiment in FIGS. 1, 2 and 3, that the limiting action provided by the integrated circuit 50 provides noise protection as well as perfect tracking. The amplitude at the output of the crispener 10 is proportional to the amplitude of the first differential, which means that the crispening waveform appearing at the output of the integrated circuit 50 on the emitter of transistor 74 will always be proportional to the amplitude of the input transition, if the transition is higher than a predetermined level. When the crispening signal, waveform F, is properly added by the adding circuit 26 to the input signal after it has been properly delayed by the delay line 24, there will be no significant preshoot or overshoot; and perfect amplitude tracking is accomplished between approximately 3 IRE units (which corresponds to a 40 decibel noise level) and 100 IRE units.

It is entirely acceptable to increase the gain of transistor 45 to allow the system to track to a lower level e.g., a level as low as 1 IRE unit, peak-to-peak. Under these conditions, extremely small transistions will be enhanced; however, the noise might be slightly increased, especially in the high frequencies of the signal. No ill effects have been noted visually on the television screen from subjective viewing when high frequency noise is slightly increased. Thus, the crispener 10 which is shown in FIGS. 1, 2 and 3 has the property of perfect tracking without subjective degradation, and includes the ability to crispen signals which are buried in noise.

SECOND EMBODIMENT, FIGS. 5–8

Figure 5:
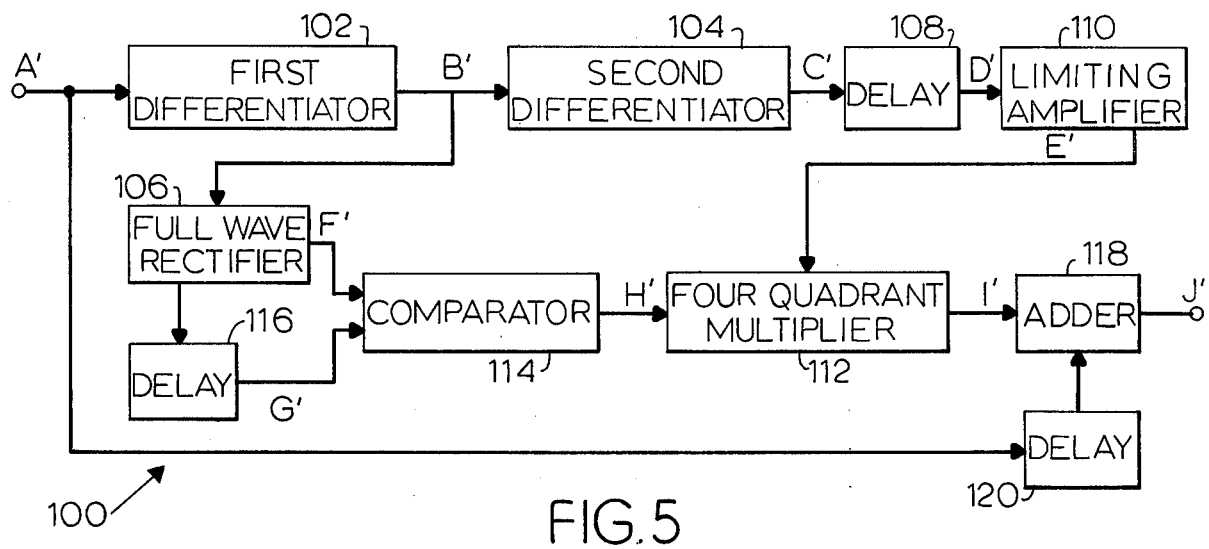
FIG. 5 is a block diagram of a second preferred embodiment of apparatus employing the principles of the present invention.
Figure 7:
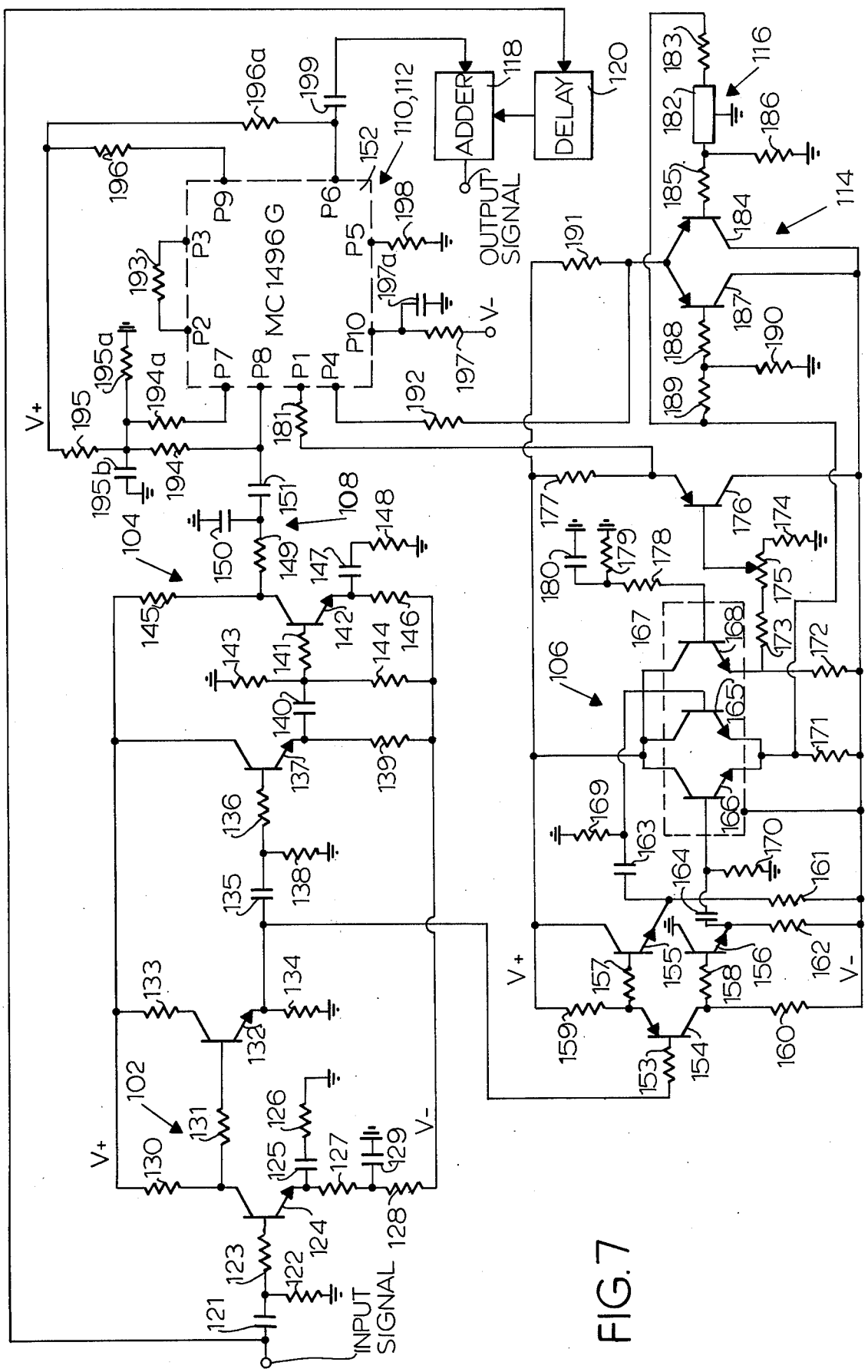
FIG. 7 is a schematic and block diagram of the circuitry of the apparatus of FIG. 4.

The second presently preferred embodiment of apparatus incorporating the principles of the present invention is shown in FIGS. 5 and 7. As shown by the waveform diagram in FIG. 6, this embodiment eliminates the undesirable edge rounding off effect, but at some additional cost and complexity.

Referring to FIG. 5, a crispener 100 includes a first differentiator 102 which is connected to receive an input signal, waveform A' of FIG. 6, and provide two differentiated outputs, waveform B': an output to a second differentiator 104, and an output to a full wave rectifier 106. The second differentiator 104 provides a second differential output, waveform C' which is applied through a delay circuit 108, waveform D', and an amplifier 110 to produce a clipped waveform, waveform E', to one input of a four quadrant multiplier 112. One output of the rectifier 106 is applied directly to a comparator circuit 114, and another output of the rectifier 106 is applied through a second delay circuit to the other input of the comparator 114. The output of the comparator 114, waveform H', provides the other input to the four quadrant multiplier 112 wherein the output of the delay circuit 110 and the output of the comparator 114 are multiplied to provide as a product the crispening signal, waveform I which is then combined in an adding circuit 118 with the original input signal to produce the crispened output signal, waveform J. The input signal is delayed by a third delay element 120 to provide it with the correct time and phase relationship with respect to the crispening signal.

The circuitry of the second embodiment is set forth in FIG. 7. The uncrispened input signal is applied through a network of a capacitor 121, shunt resistor 122 and series resistor 123 to the base of a transistor 124. The emitter circuit of the transistor 124 includes a series connected RC network including a capacitor 125 and a resistor 126 connected between the emitter and ground. The emitter of the transistor 124 is connected to the minus voltage bus V+ through series connected resistors 127 and 128. A capacitor 129 is connected from the node between resistors 127 and 128 to ground. A load resistor 130 connects the collector of transistor 124 to the plus voltage bus V+.

A stabilizing resistor 131 tranfers the output signal from the collector of transistor 124 to the base of a transistor 132 which is connected as an emitter follower. A low value unbypassed collector resistor 133 connects the collector of the transistor 132 to the V+bus, and an emitter resistor 134 connects the emitter to ground. The circuitry just described provides the first differentiator 102 of the second crispener circuit 100.

The output signal from the transistor 132 is taken in a first path from the collector thereof through a blocking capacitor 135 and a series impedance matching resistor 136 to the base of an emitter follower transistor 137. A resistor 138 is connected from a node between the capacitor 135 and resistor 136 to ground to set the bias point for the transistor 137. The collector of transistor 137 is returned directly to the V+ bus. The emitter of transistor 137 is connected through resistor 139 to the V− bus.

The signal output from transistor 137 is taken from the emitter through a network consisting of a series capacitor 140 and series resistor 141 to the base of a transistor 142. A shunt resistor 143 is connected from ground to the node between capacitor 140 and resistor 141, and a second resistor 144 is connected between the same node and the V− bus so that resistors 143 and 144 set the bias point for the transistor 142. The collector of transistor 142 is returned to the V+ bus through a load resistor 145, and the emitter of transistor 142 is returned to the V− bus through an emitter resistor 146. A series RC network is provided in the emitter circuit of transistor 142 by the capacitor 147 and resistor 148. The foregoing circuitry described in connection with transistor 137 and 142 provides the second differentiator 104 of the crispener 100. The differentiation function provided by transistors 137 and 142 and related circuitry is accomplished in the same manner as followed by the previously described first differentiator 102. Thus the signal appearing at the collector of transistor 142 is a second differential of the input signal, waveform C' of FIG. 6. The function of resistor 148 is to render differentiation ineffective past a predetermined out-of-band high frequency, and to avoid oscillations which would otherwise result from an indefinite +6db per octave response.

The second differential signal output at the collector of transistor 142 is delayed by 10 to 20 nanoseconds without waveform distortion by the RC network consisting of a series resistor 149 and shunt capacitor 150 to provide the first delay circuit 110 of the crispener 100. The delay provided by the resistor 149 and capacitor 150 is selected to match the delay of the signal path through the double rectifier 106, second delay 116 and comparator 114.

After the delay the signal is applied to an input of the four quadrant multiplier 112 which is implemented with the same Motorola MC 1496 G integrated circuit previously described. The signal is applied to pin P8 of the integrated circuit 152 through a blocking capacitor 151.

A signal output of the first differentiator 102 follows a second path from the emitter of transistor 132, through a matching resistor 153, to the base of a PNP transistor 154. Transistor 154 functions as a phase inverter to provide outputs of equal and opposite phase to transistors 155 and 156 through an emitter to base resistor 157 and a collector to base resistor 158, respectively. The emitter of transistor 154 is returned to the V+ bus through a resistor 159 and the collector of transistor 154 is returned to the V− bus through a collector resistor 160. The transistors 155 and 156 are wired as emitter followers to provide impedance matching to drive the full wave rectifier circuit 106. In the case of transistors 155 the collector is returned to the V− bus through a resistor 161. In the case of the transistor 156 the collector is grounded and the emitter is returned to the V− bus through a resistor 162. The emitter outputs of transistors 155 and 156 are provided through blocking capacitors 163 and 164 to bases of transistors 165 and 166, respectively.

Transistors 165 and 166 provide the double rectifier 106 of the crispener 100. As with the first embodiment, transistors 165 and 166 may be two transistors of a monolithic integrated circuit 167 such as type CA 3018 A made by Radio Corporation of America. Biasing resistors 169 and 170 are connected from the bases of transistors 165 and 166 to ground, respectively. The emitter and collectors of transistors 165 and 166 are tied together, with the collectors connected directly to the V+ bus and the emitters connected through a resistor 171 to the V− bus. The collectors of transistors 165 and 166 are connected to the collector of the transistors 168. The emitter of the transistor 168 is connected to the V− bus through a resistor 172 and to ground through a combination of resistors 173, 174 and potentiometer 175. The third transistor 168 of the IC 167 is used solely to compensate for temperature drift in the same manner as it was employed in connection with the first embodiment. The base circuit of transistor 168 includes two series resistors 178 and 179 and a bypass capacitor 180 to ground connected at the node between the resistors 178 and 179.

The wiper of potentiometer 175 is connected to the base of a PNP transistor 176 configured as an emitter follower and its collector connected to the V− bus and its emitter connected to the V+ bus through a resistor 177. A signal output from the transistor 176, being one output of the double rectifier 196 is applied to the multiplier circuit 152 at an input port via a connection from the emitter of transistor 176 through a resistor 181 to pin P1 of IC 152.

The interconnected emitters of transistors 165 and 166 of the double rectifier are connected to the input of a 100 nanosecond delay line 182 through a matching resistor 183. The output from the delay 182 is provided to the base of a transistor 184 through a series resistor 185. A shunt resistor 186 to ground in the base circuit of transistor 184 sets the bias point. The collector of the PNP transistor 184 is returned to the V− bus as is the collector of the PNP transistor 187. The emitter of transistor 184 is in common with the emitter of the transistor 187. The transistors 184 and 187 provide the comparator circuit 114. The base circuit of transistor 187 is connected to the common emitters of transistors 165 and 166 through series resistors 188 and 189. A shunt resistor 190 to ground is connected at the node between resistors 188 and 189 to set the bias point of transistor 187. The common emitters of transistors 184 and 187 are returned to the V+ voltage bus through a load resistor 191. The two signals appearing on the bases of transistors 184 and 187 are of equal amplitude and polarity: they are identical with the exception of the 100 nanosecond delay of the signal at the base of transistor 184 and 187, waveform H of FIG. 6, will be the most negative of these two signals and is sent to pin P4 of the four quadrant multiplier IC 152 through an input matching resistor 192. In the multiplier IC 152, the signals appearing on pins P1 and P4 are always tracking from DC, and the signal appearing on pin P4 will be mutliplied in exactly the same fashion as done by the mulipiler 22 described in connection with the first preferred embodiment, i.e., by a function of the second differential which appears on pin P8 of the IC 152.

As explained in connection with the previously described embodiment, a resistor 193 connected between pins P2 and P3 of IC 152 controls the gain thereof. Resistors 194, 194a, 195 and 195a function to bias the transistors in the IC 152 connected at pins P7 and P8. The common node formed by resistors 194, 194a, 195, 195a is bypassed by a capacitor 195b. Resistors 196 and 196a are connected from pins P9 and P6 respectively of IC 151 to the V+ bus, and connection to the V− bus is provided to IC 152 through a resistor 197. Pin P10 of IC 152 is decoupled by a bypass capacitor 198. Output is taken from IC 152 from pin P6 thereof via a blocking capacitor 199. The output is supplied through an adding circuit 118 where it is added to the input signal as delayed by the delay element 120. Circuit elements 118 and 120 of FIG. 6 correspond to the elements previously described under circuits 24 and 26 of the first preferred embodiment. Those descriptions are incorporated herein and no further mention will be made.

The crispener 100 of the second preferred embodiment provides the same characteristics as the crispener 10 of the first embodiment insofar as tracking and noise protection are concerned. An interesting side effect of the comparison between the rectified first differential and delayed rectified first differential signals is the apparent increase in contrast of small line details, for example the sine square pulse, which approximates closely the subject appearance of a high bandwidth directly obtained from linear processing.

The processing of small line details as exemplified by sine square pulses is illustrated by the waveforms of FIG. 8. The sine square input pulse is shown as waveform A'. The first differential signal from the first differentiator 102 of FIG. 5 is waveform B'. The second differentiator 104 produces waveform C'. The full wave rectifier 106 produces waveform F' and waveform G' is provided by the 100ns delay circuit 116. The output of the comparator 114 is shown as waveform H', and the crispening signal for the sine square impulse as provided by the multiplier 112 is waveform I'. After summing the crispening signal with the properly delayed input signal at the adder 118, the crispened impulse, waveform J', is output.

A sine square pulse undergoing linear processing within high bandwidth video equipment is illustrated as a reference in waveform L of FIG. 8. Comparison of waveform L' with waveform J' demonstrates the efficacy of the crispener 100 to provide an output undistinguishable over that obtained over highly linear high bandwidth video signal paths.

Third Embodiment, FIGS. 9, 10, 11 and 12

The third presently embodiment differs from the two embodiments previously described in that a first signal is enhanced by a second signal closely related to the first signal in its content and preferably having a higher bandwidth. A good practical use is when the first signal is chroma and the second signal is luminance in a color television signal format. The circuit operation which follows will be described by using chroma and luminance as examples of the two signals, but is evident that the use of this circuit is not limited to chroma and luminance and that other interrelated signals may be utilized for crispening. For example, two colors in a color television camera chain with green (being typically of greater bandwidth) being used to enhance red or blue information.

Figure 9:
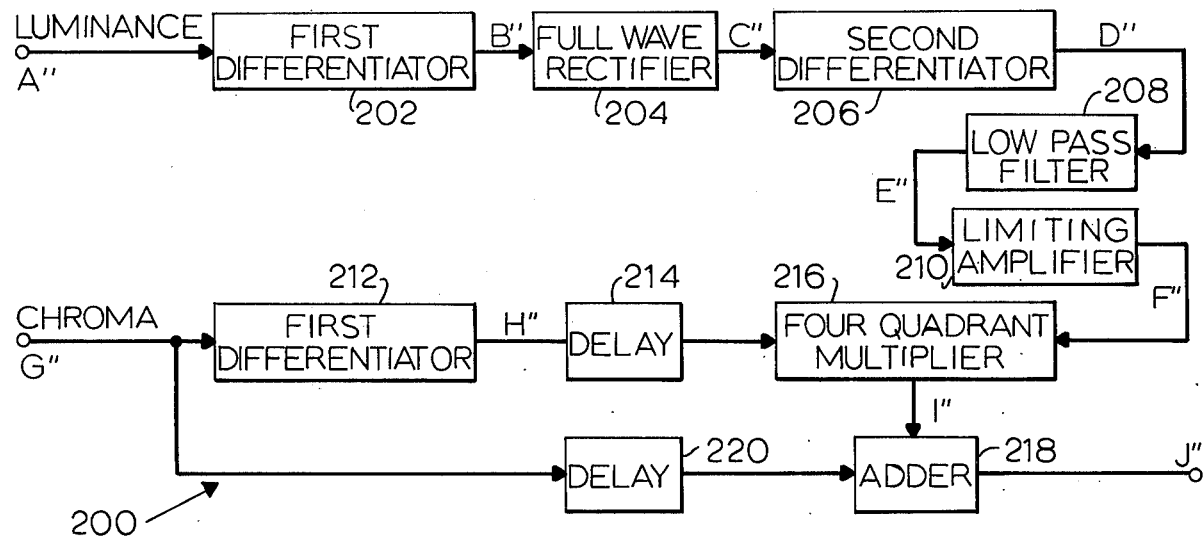
FIG. 9 is a block diagram of a third preferred embodiment of apparatus employing the principles of the present invention for crispening color video images.

Referring first to FIG. 9, a crispener 200 includes a luminance channel input and a chroma channel input. The luminance channel includes the interconnected combination of a first differentiator 202, a full wave rectifier 204, a second differentiator 206, a low pass filter 208, and a limiting amplifier 210. The chroma channel includes a first differentiator 212, and a delay 214. A four quadrant multiplier 216 of the type previously described herein, receives signals from the limiting amplifier 210 and from the delay 214 and multiplies them to produce as a product a crispening signal which is provided to an adder circuit 218. The input chroma signal is taken through a delay element 220 and then applied to the adder circuit 218 where it is summed with the crispening signal from the four quadrant multiplier 216.

The operation of the crispener 200 may now be explained in connection with the waveform diagram of FIG. 10. The luminance transition shown as waveform A'' of FIG. 10 is differentiated once by the first differentiator 202 to produce waveform B''. The differentiated luminance transition is then rectified by the full wave rectifier 204 to produce waveform C''. The full wave rectified signal is then differentiated a second time by the second differentiator 206 to produce waveform D'' and then is passed through a low pass filter 208 to produce the waveform shown as waveform E''. The low pass filter signal is then applied to a limiting amplifier to limit amplitudes and produce the square wave shown in waveform F''. In the chroma path the lower frequency chroma input transition, waveform G'', is differentiated by the first chroma differentiator 212 to produce waveform H''. The first differential of chroma is then delayed by the delay circuit 214 for a time to coincide with the delay required for the luminance signal to pass through the luminance channel. The delayed first differentiated chroma signal and the filtered and limited second fifferential of luminance are multiplied together by the four quadrant multiplier 216 to produce as a product the crispening signal shown as waveform I'' of FIG. 10. The product output of the four quadrant multiplier 216 is applied to the adder 218 along with the input chroma signal G'' which has been delayed by delay element 220. The two signals are then summed by the adder 218 to produce a crispened output signal shown as waveform J' of FIG. 10.

Figure 11:
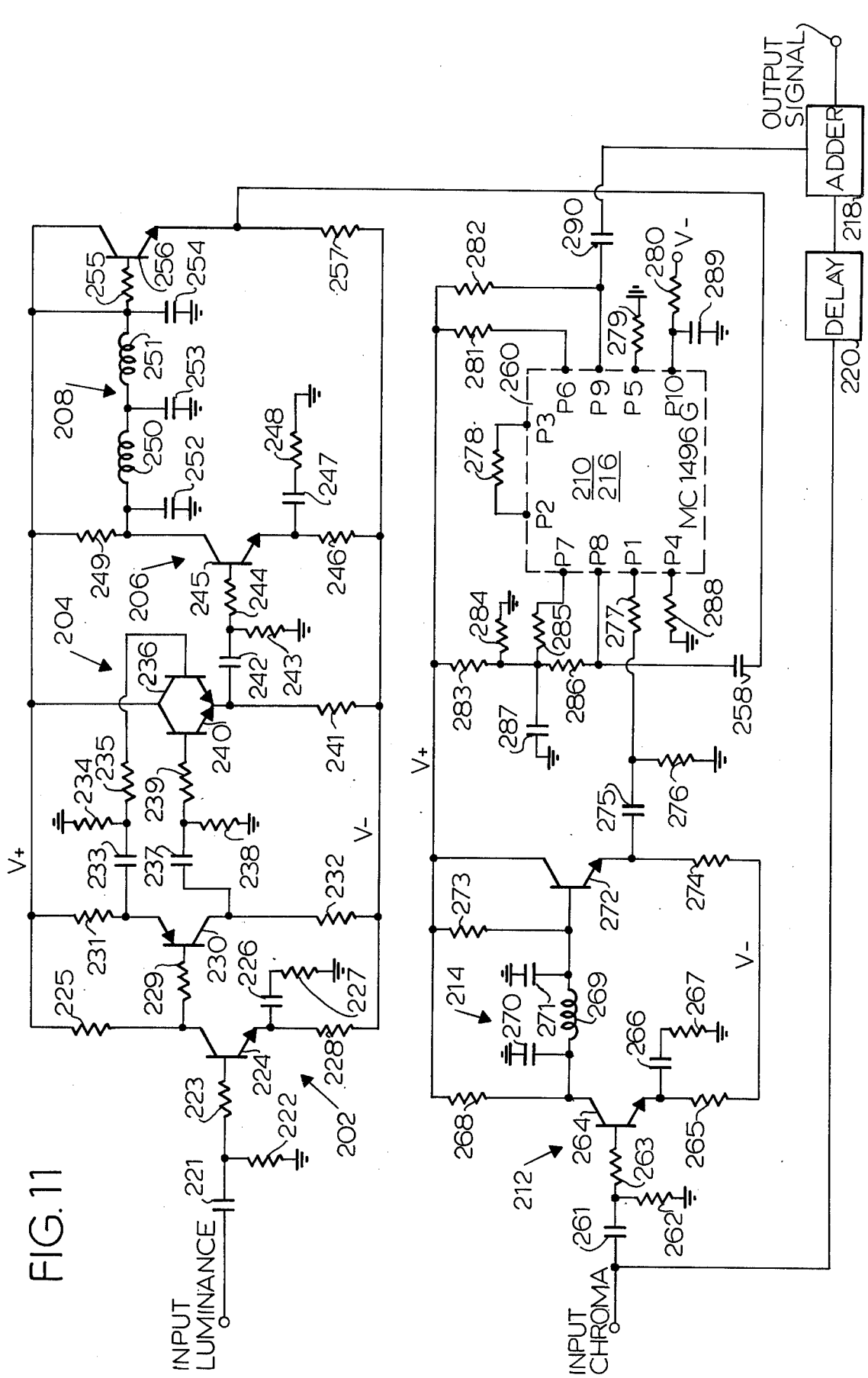
FIG. 11 is a schematic and block diagram of the circuitry of the apparatus of FIG. 9.

A specific embodiment of the crispener 200 is shown in FIG. 11. A luminance signal is input through a network consisting of a capacitor 221, a shunt resistor 222, and a series resistor 223 to the base of the transistor 224 which functions with its relates circuitry to provide the first differentiator 202. The collector of transistor 224 is provided with a load resistor 225 returned to the plus voltage bus V+. The emitter circuit includes an RC network comprised of a capacitor 226 and a resistor 227. The emitter circuit also includes the emitter resistor 228 which is returned to the minus voltage bus V−.

The output of the differentiator transistor 224 is taken through a resistor 229 to the base of the transistor 230 which functions as a phase inverter providing equal and oppositely phased signals on the collector and emitter. An emitter resistor 231 is returned to the V+ bus and a collector resistor 232 is returned to the V− bus. The signal on the emitter of transistor 230 is taken through a blocking capacitor 233, shunt resistor 234 and series resistor 235 the the base of a transistor 236. The signal from the collector of the transistor 230 is taken through a blocking capacitor 237, shunt resistor 238 and series resistor 239 to the base of the transistor 240. The collectors and emitter of transistors 236 and 240 are tied together to provide the full wave rectifier circuit 204. The common emitters are connected to the V− bus through a load resistor 241, and the common emitters are tied directly to the V+ bus.

The fully rectified signal on the connected emitters of transistors 236 and 240 is subjected to a second differentiator circuit 206 comprising an input circuit of series capacitor 242, shunt resistors 243 and series resistor 244 at the base of a transistor 245. The emitter circuit of transistor 245 is connected to the V− bus through a resistor 246. The emitter circuit also includes a series RC network including capacitor 247 and resistor 248. The collector of transistor 245 is returned to the V+ bus through a load resistor 249.

The second differential of luminance signal is passed from the collector of the transistor 245 through a low pass network 208 including series inductors 250 and 251 and shunt capacitors 252, 253 and 254. The output of the low pass filter 208 is passed through a series resistor 255 to the base of a transistor 256 configured as an emitter follower with its collector returned directly to the V+ bus. A load resistor 257 is connected between the emitter of transistor 256 and the V− bus. The output signal from the transistor 256 is passed through a blocking capacitor 258 and thence to pin P8 of a doubly balanced AM modulator integrated circuit 260 which provides the four quadrant multiplier 216 function as well as the limiting amplifier 210 function as set forth in the block diagram of FIG. 9.

Chroma information is input to the first chroma differentiator circuit 212 through a capacitor 261, a shunt resistor 262, and series resistor 263 to the base of a transistor 264. The emitter of the transistor 264 is returned to the V− bus through a resistor 265. The emitter circuit also includes a series RC network of capacitor 266 and resistor 267. The collector of the transistor 264 is returned to the voltage bus through a load resistor 268.

The differentiated output signal is taken from the collector of transistor 264 through a low pass filter circuit 214 which includes a series inductance 269 and two parallel capacitors 270 and 271. The output of the low pass filter 214 is connected to the base of a transistor 272 which is configured as an emitter follower. The collector of transistor 272 is returned directly to the V+ bus and a resistor 273 is connected from the base to the V+ bus to fix the bias point for transistor 272. A load resistor 274 connects the emitter of transistor 272 to the V− bus.

The delayed signal is taken from the emitter of transistor 272 to pin P1 of the integrated circuit 260 through a blocking capacitor 275, shunt resistor 276 and series resistor 277.

The operation of integrated circuit multiplier 260 is the same as previously described and will not be further described except to note that gain is established by the value of resistor 278 between pins P2 and P3, bias is established by a resistor 279 from pin P5 to ground, voltages are supplied from the V− bus through a resistor 280 to pin P10 and from the V+ bus through a resistor 281 to pin P6 and 282 to pin P9. Input impedance and bias voltages are fixed by resistors 283, 284, 285, and 286. Decoupling is provided at the common node of resistors 283, 284, 285 and 286 by a capacitor 287. Limiting action within the integrated circuit 260 is established by selecting proper signal level on pin P8. Pin P4 of IC 260 is connected to ground through a resistor 288; also, a decoupling capacitor 289 is connected from pin P10 of IC 260 to ground.

The product produced by the four quadrant multiplier 260 is taken from pin P9 to the adder circuit 218 through a suitable blocking capacitor 290.

The adder circuit 218 and delay 220 have been described in connection with the first embodiment and that description is incorporated herein by reference.

As will be appreciated from the foregoing description the advantages of the crispener 200 are quite significant when used in color television. For example, in a camera the crispener may be used to crispen red, blue and green channels by either green in three tube cameras or by a luminance channel in four tube camera. Besides increasing apparent bandwidth of the crispened channel, such a circuit will automatically eliminate positional discrepancies between the channels in the horizontal direction and will consequently make registration of camera tubes easier. It will also allow the use of the lower resolution and less sensitive, inexpensive tubes in the enhanced or crispened channels with only one channel being required to be capable of high picture quality.

When used after matrixing on the I and Q channels such a circuit 200 will not only increase the I and Q resolution but will also eliminate chroma-luminance delay (if such delay is not excessive at the beginning) because of the visible step function which is characteristic of a color transition is now created by and timed to coincide with the luminance transition.

Figure 12:
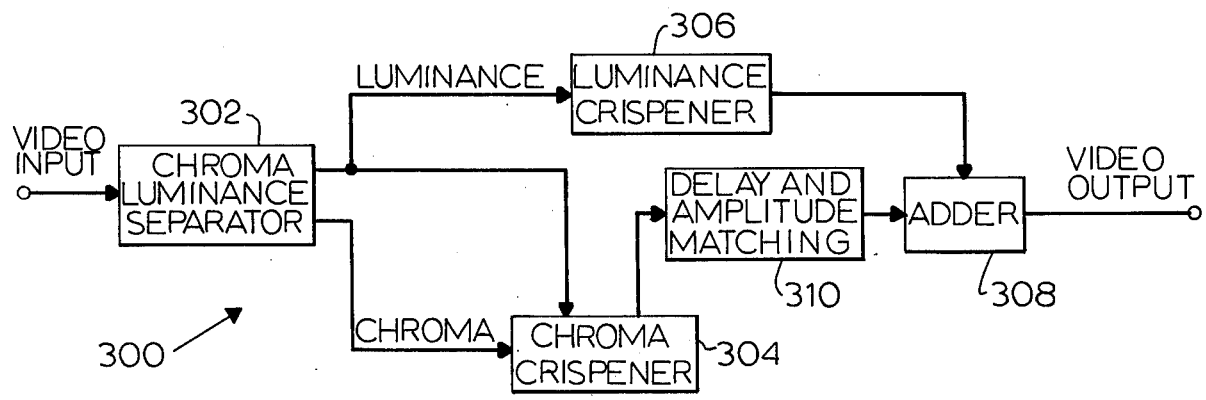
FIG. 12 is a block diagram of a preferred embodiment of a system for crispening color television images wherein both luminance and chroma signals are crispened in accordance with the principles of the present invention.

Color Crispener, FIG. 12

A crispener system 200 suitable for crispening color video signals is illustrated in FIG. 12. The input signal is applied to a chroma-luminance separator 302. Such a separator is preferably a high performance unit and may advantageously utilize a comb filter with video signals in the NTSC format in order to deliver at its output chroma and luminance signals without bandwidth degradation and mutual cross talk. Chroma and luminance are then separately crispened with the chroma by a chroma crispener 304 and the luminance by a luminance crispener 206. The chroma crispener 304 is preferably of the type shown as the third embodiment herein although either the first or second embodiment may also be utilized. The luminance crispener is of the first or second embodiment herein and may also include some noise curing features well known to those skilled in the art. Both crispened signals are then added in an adder circuit 308 after the chroma signal has been properly delayed and its amplitude adjusted to correspond with the luminance amplitude by a suitable circuit 310. Either of the two crispenings shown in the crispener 300 may be omitted if signal conditions and equipment cost considerations so require.

To those skilled in the art to which this invention relates, many changes in construction and widely differing embodiments and applications of the invention will suggest themselves without departing from the spirit and scope of the invention. The disclosures and the description herein are purely illustrative and are intended to be in any sense limiting. More particularly, these techniques are immediately applicable to the case of PAL and Secam format television signals, as well as to imaging systems such as facsimile which is not necessarily related to television.

I claim:

1. A method of shortening the transition time of transitions occurring in related high speed aperiodic signals including the steps of differentiating a first related signal having transistions to be shortened to provide a first differential of said first signal, twice differentiating a second signal which is related to said first signal to provide a second differential of said second signal, producing a function of said first differential of said first signal, producing a function of said second differential of said second signal, multiplying said function of said first differential of said first signal by said function of said second differential of said second signal to produce a product, delaying said first signal by a time factor equal to transit delay introduced in generating said product to provide a delayed first signal, adding said product and said delayed first signal in phase to produce a sum which is the first signal having the transitions thereof shortened.

2. The method set forth in claim 1 wherein said related high speed aperiodic signals provide a video signal.

3. The method set forth in claim 1 wherein said first signal is substantially identical with said second signal.

4. The method set forth in claim 1 wherein said first signal is the same as said second signal.

5. The method set forth in claim 1 wherein said related high speed aperiodic signals provide a color television video signal and said first signal contains color chroma information and said second signal contains picture luminance information and including within the step of twice differentiating said second signal the steps of making the first differential of said second signal a sign-independent value by full wave rectification and amplifying said second differential below a predetermined limiting level and limiting above said level the amplitudes of said second differential of said second signal to provide said function of said second differential of said second signal and including the further step of delaying said first differential of said first signal by a predetermined amount to provide said function of said first differential of said first signal.

6. The method set forth in claim 1 wherein said related high speed aperiodic signals provide a color television video signal and including as a first step the further step of separating color chroma information and picture luminance information in said video signal and then applying the steps of claim 1 to separated luminance information to shorten the time of transitions thereof in an operation wherein said first signal and said second signal are the same luminance information, applying the steps of claim 1 to separated chroma information to shorten the times of transition in a step wherein said first signal is said chroma information and said second signal is said luminance information, and including the further subsequent steps of matching the amplitude and timing of said transition time shortened chroma information with said transition time shortened luminance information and then combining said amplitude and time matched transition time shortened chroma and luminance to provide a processed color television video output signal of apparent high picture resolution.

7. The method set forth in claim 1 including the step of making said first differential of said first signal independent of sign and direction of transition of said first signal to provide said function of said first differential of said first signal.

8. The method set forth in claim 7 wherein said step of making said first differential of said first signal a sign independent function is accomplished by full wave rectification of said first differential of said first signal.

9. The method set forth in claim 7 wherein said first signal is substantially identical with said second signal.

10. The method set forth in claim 7 wherein said first signal is the same as said second signal.

11. The method set forth in claim 1 including the step of amplifying said second differential of said second signal below a predetermined limiting level and limiting above said predetermined level the amplitude of said second differential of said second signal to provide said function of said second differential of said second signal.

12. The method set forth in claim 11 wherein said first signal is substantially identical with said second signal.

13. The method set forth in claim 11 wherein said first signal is the same as said second signal.

14. The method set forth in claim 11 wherein said function of said first differential of said first signal is provided by the steps of making said first differential of said first signal independent of sign and direction of transition of said first signal by full wave rectification thereof to provide a rectified first differential signal, delaying said rectified first differential signal, delaying said rectified first differential signal by a predetermined amount, and generating a comparison signal identical at any instant to the smaller of said rectified first differential signal and said delayed rectified first differential signal to provide said function of said first differential of said first signal.

15. The method set forth in claim 14 wherein said related high speed aperiodic signals provide a color television video signal and said first signal contains color chroma information and said second signal contains picture luminance information.

16. Apparatus for shortening the transition time of transitions occurring in related high speed aperiodic signals including the steps of first differentiator means for differentiating a first related signal having transitions to be shortened to provide a first differential of said first signal, multiple differentiation means for twice differentiating a second signal which is related to said first signal to provide a second differential of said second signal, first processing means connected to said first differentiation means for producing a function of said first differential of said first signal, second processing means connected to said multiple differentiation means for producing a function of said second differential of said second signal, multiplier means connected to said first processing means and to said second processing means for multiplying said function of said first differential of said first signal by said function of said second differential of said second signal to produce a product, first delay means for delaying said first signal by a time factor equal to transit delay introduced in generating said product to provide a delayed first signal, adder means connected to said multiplier means and said first delay means for adding said product and said delayed first signal in phase to produce a sum which is the first signal having the transitions thereof shortened.

17. The apparatus set forth in claim 16 wherein said related high speed aperiodic signals provide a video signal.

18. The apparatus set forth in claim 16 wherein said first signal is substantially identical with said second signal.

19. The apparatus set forth in claim 16 wherein said first differentiator means is connected to form a part of said multiple differentiation means and wherein said first signal is the same as said second signal.

20. The apparatus set forth in claim 16 wherein
said related high speed aperiodic signals provide a color television video signal and said first signal contains color chroma information and said second signal contains picture luminance information;
said multiple differentiation means includes a first differentiator a full wave rectifier circuit connected to said first differentiator, and a second differentiator connected to said full wave rectifier circuit;
said second processing means includes limiting amplifier means for amplifying said second differential of said second signal below a predetermined level the amplitude of said second differential of said second signal; and,
said first processing means includes a third delay means for delaying said first differential of said first signal by an amount equal to the transit delay resulting from processing of said second signal through said multiple differentiation means and said second processing means.

21. The apparatus set forth in claim 16 wherein said related high speed aperiodic provide a color television video signal and said first signal contains color chroma and said second signal contains picture luminance information and further comprising
separator means connected to said first differentiator means and to said multiple differentiation means for separating said first signal and said second signal and for providing said first signal to said first differentiator means and for providing said second signal to said multiple differentiation means,
second signal transition shortening means connected to receive said second signal from said separator means for reducing the time of transitions occurring in said second signal, said second signal transition shortening means including therewithin a first differentiator, a full wave rectifier circuit connected to said first differentiator, a second differentiator connected to said first differentiator, a limiting amplifier connected to said second differentiator, a four quadrant multiplier connected to said full wave rectifier circuit and to said limiting amplifier, an adder circuit connected to said four quadrant multiplier, and a delay connected between said separator means and said adder,
delay and amplitude matching means connected to said adder means for delaying and amplitude matching said transition shortened first signal with said transition shortened second signal,
a video adder circuit connected to said adder circuit in said second signal transition shortening means and to said delay and amplitude matching means for providing a video signal wherein both chroma and luminance information have the durations of transitions thereof shortened.

22. The apparatus set forth in claim 16 wherein said first processing means is operable to make said first differential of said first signal independent of sign and direction of transition of said first signal.

23. The apparatus set forth in claim 22 wherein said first processing means includes a full wave rectifier circuit.

24. The apparatus set forth in claim 23 wherein said first differentiator means is connected to form a part of said multiple differentiation means and wherein said first signal is the same as said second signal.

25. The apparatus set forth in claim 16 wherein said second processing means comprises limiting amplifier means for amplifying said second differential of said second signal below a predetermined limiting level and limiting above said predetermined level the amplitude of said second differential of said second signal to provide said function of said second differential of said second signal.

26. The apparatus set forth in claim 25 wherein said first differentiator means is connected to form a part of said multiple differentiation means and wherein said first signal is the same as said second signal.

27. The apparatus set forth in claim 25 wherein said first processing means includes a full wave rectifier circuit for making said first differential of said first signal independent of sign and direction of transition of said first signal to provide a rectified first differential signal, second delay means connected to said full wave rectifier for delaying said rectified first differential signal by a predetermined amount and comparator means connected to said full wave rectifier circuit and to said second delay means for generating a comparison signal identical at any instant to the smaller of said rectifier first differential signal and said delayed rectified first differential to provide said function of said first differential of said first signal.

28. The apparatus set forth in claim 27 wherein said related high speed aperiodic signals provide a color television video signal and said first signal contains color chroma information and said second signal contains picture luminance information.

* * * * *

UNITED STATES PATENT AND TRADEMARK OFFICE
CERTIFICATE OF CORRECTION

PATENT NO. : 4,030,121
DATED : June 14, 1977
INVENTOR(S) : YVES C. FAROUDJA

It is certified that error appears in the above–identified patent and that said Letters Patent are hereby corrected as shown below:

Column 8, line 51, replace "V+" with -- V- --;

line 56, "tranfers" should read --transfers--;

Column 10, line 28, replace "196" with --106--;

Column 11, line 5, replace "151" with --152--;

line 50, after "presently" insert --preferred--;

Column 12, line 42, replace "J'" with --J"--;

line 47, "relates" should read --related--;

Column 17, line 35, after "aperiodic" insert --signals--.

Signed and Sealed this

Twentieth Day of September 1977

[SEAL]

Attest:

RUTH C. MASON
Attesting Officer

LUTRELLE F. PARKER
Acting Commissioner of Patents and Trademarks